United States Patent
Fu et al.

(10) Patent No.: US 11,416,219 B2
(45) Date of Patent: Aug. 16, 2022

(54) TRUE RANDOM NUMBER GENERATOR AND METHOD FOR GENERATING TRUE RANDOM NUMBER

(71) Applicant: REALTEK SEMICONDUCTOR CORPORATION, Hsinchu (TW)

(72) Inventors: Huye Fu, Suzhou (CN); Tianyi Zhu, Suzhou (CN); Zuohui Peng, Suzhou (CN); Fengqiao Ye, Suzhou (CN); Yuxiang Qi, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 250 days.

(21) Appl. No.: 16/825,446

(22) Filed: Mar. 20, 2020

(65) Prior Publication Data
US 2021/0019118 A1 Jan. 21, 2021

(30) Foreign Application Priority Data

Jul. 15, 2019 (CN) .......................... 201910637803.0

(51) Int. Cl.
*G06F 7/58* (2006.01)
*G06F 5/06* (2006.01)

(52) U.S. Cl.
CPC ................ *G06F 7/588* (2013.01); *G06F 5/06* (2013.01)

(58) Field of Classification Search
CPC ............... G06F 7/58; G06F 7/588; G06F 5/06
USPC .................................................. 708/250, 255
See application file for complete search history.

(56) References Cited

U.S. PATENT DOCUMENTS

| 6,195,669 | B1 * | 2/2001 | Onodera | G06F 7/588 |
| | | | | 708/250 |
| 9,477,443 | B1 * | 10/2016 | Belinski | G06F 7/588 |
| 2016/0132296 | A1 * | 5/2016 | Park | H04L 9/0866 |
| | | | | 708/255 |
| 2019/0303105 | A1 * | 10/2019 | Pitu | G06F 7/584 |

FOREIGN PATENT DOCUMENTS

| CN | 103294447 | 9/2013 |
| CN | 203909778 U | 10/2014 |
| CN | 104407838 | 3/2015 |
| CN | 104699451 | 6/2015 |
| CN | 107111480 | 8/2017 |
| CN | 107193532 | 9/2017 |

(Continued)

OTHER PUBLICATIONS

Burr-Brown from Texas Instruments, ADS805 datasheet, texas instruments, 2002 (Year: 2002).*

(Continued)

*Primary Examiner* — Emily E Larocque
(74) *Attorney, Agent, or Firm* — WPAT, PC

(57) ABSTRACT

Disclosed is a true random number generator and a method for generating a true random number. The true random number generator includes a sampling circuit and a random number generating circuit. The sampling circuit is configured to sample N voltage(s) of N capacitors according to a clock signal and thereby generate N sample value(s), in which the N is a positive integer. The random number generating circuit is configured to generate a random number according to at least a part of the N sample value(s).

18 Claims, 10 Drawing Sheets

(56) References Cited

FOREIGN PATENT DOCUMENTS

| | | |
|---|---|---|
| CN | 108399063 | 8/2018 |
| TW | 200504584 | 2/2005 |

OTHER PUBLICATIONS

OA letter of the counterpart TW application (appl No. 108128991) dated Jun. 30, 2020. Summary of the OA letter: Claims 1-7 are rejected as being unpatentable over the cited reference 1 (CN 203909778 U) in view of the cited reference 2 (TW 200504584 A).

* cited by examiner

TRUE RANDOM NUMBER GENERATOR AND METHOD FOR GENERATING TRUE RANDOM NUMBER

BACKGROUND OF THE INVENTION

1. Field of the Invention

The present disclosure relates to a random number generator and a method for generating a random number, especially to a true random number generator and a method for generating a true random number.

2. Description of Related Art

The utilization of a random number is important to the fields of statistics, industry, science, life, and so on. A random number can be generated by a random number generator. There are two kinds of random number generator; one is pseudo-random number generator (PRNG) and the other one is true-random number generator (TRNG). A PRNG uses an algorithm to generate a pseudo random number sequence; however, the pseudo random number sequence is no guarantee of sufficient uncertainties and is inappropriate for a field in want of high security. The TRNG uses a random source of the nature of things or of the process of technics to generate a true random number which is usually used in the field in want of high security.

Most mobile intelligent devices and embedded-system devices nowadays make use of a pseudo random number generated by an algorithm, but this is no guarantee of security. On the other hand, the production of a true random number usually requires additional peripheral hardware circuits which lead to the increase of the cost, circuit area, and power consumption; moreover, the way to produce a true random number is usually complicated (e.g., the ultra high speed quantum technique based on laser phase fluctuation) and hard to be realized. For an electronic device (e.g., an Internet of Things (IoT) or a consumer electronic device), the reduction of hardware cost, the decrease of circuit area, and the reduction of power consumption are important; in view of the above requirements, a reliable and efficient true random number generator that is easy to be realized with controllable cost and less/no additional hardware expense will be very helpful to this technical filed.

SUMMARY OF THE INVENTION

An object of the present disclosure is to disclose a true random number generator and a method for generating a true random number that are reliable, efficient, and inexpensive.

An embodiment of the true random number generator of the present disclosure includes a sampling circuit and a random number generating circuit. The sampling circuit is configured to sample N voltage(s) of N capacitor(s) according to a clock signal and thereby generate N sample value(s), in which the N is a positive integer. The random number generating circuit is configured to generate a random number according to at least a part of the N sample value(s). Since the capacitance of the N capacitor(s) varies with random factors such as environmental conditions and noise, each voltage of the N capacitors is random and consequently the random number derived therefrom is truly random.

An embodiment of the method of the present disclosure for generating a true random number includes the following steps: sampling N voltage(s) of N capacitor(s) according to a clock signal and thereby generate N sample value(s), in which the N is a positive integer; and generate the true random number according to at least a part of the N sample value(s). Since the capacitance of the N capacitor(s) varies with random factors such as environmental conditions and noise, the N voltage(s) of the N capacitor(s) is/are random and consequently the random number derived therefrom is truly random.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure discloses a true random number generator and a method for generating a true random number. In virtue of the parasitic capacitors that are existing in pins of a chip and in PCB wires connected to the pins of the chip varying randomly with factors such as temperature, humidity, and noise, the true random number generator and generating method of the present disclosure are allowed to generate a true random number with the parasitic capacitors. It should be noted that the true random number generator and generating method of the present disclosure can generate a true random number with other kinds of parasitic capacitors, if practicable; in addition, if a non-parasitic capacitor is coupled to the aforementioned pins of the chip, this non-parasitic capacitor can also be used for generating a true random number by the true random number generator and generating method of the present disclosure.

Figure 1:
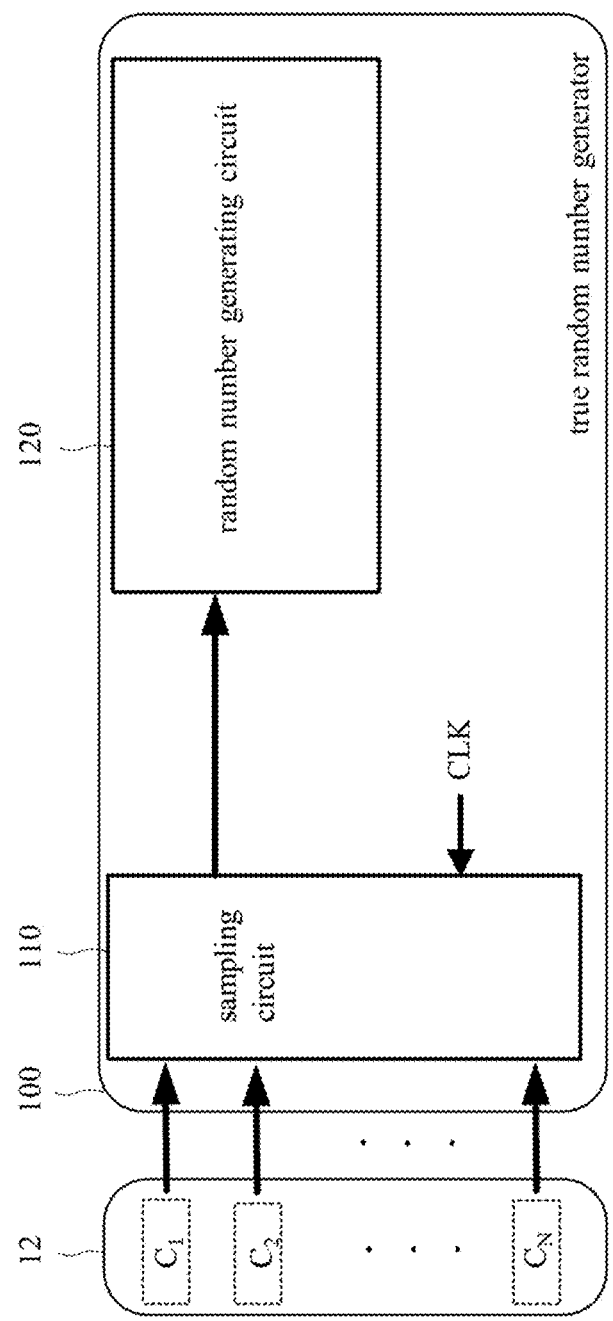
FIG. 1 shows an embodiment of the true random number generator of the present disclosure.

FIG. 1 shows an embodiment of the true random number generator of the present disclosure. The true random number generator 100 of FIG. 1 is coupled to N capacitor(s) 12 ($C_1$~$C_N$) and includes a sampling circuit 110 and a random number generating circuit 120. The sampling circuit 110 is used for sampling N voltage(s) of the N capacitor(s) according to a clock signal CLK and thereby generating N sample value(s). The N capacitor(s) 12 is/are capacitor(s) used by the true random number generator 100; the N is a positive integer, the source of the clock signal CLK can be a known or self-developed clock source and optionally included in or independent of the true random number generator 100; and the frequency of the clock signal CLK is between 100 kHz and 300 kHz in this embodiment, but the present invention is not limited thereto. The random number generating circuit 120 is configured to generate a random number according to at least a part of the N sample value(s). It should be noted that the sampling circuit 110 can sample a predetermined number of capacitor(s) of the N capacitor(s) 12 or sample all of the N capacitor(s) 12 in a predetermined order (e.g., a continuous order from $C_1$ to $C_N$ or discontinuous order). It should also be noted that the true random number generator 100 can be coupled to other devices (e.g., a host including a microcontroller (MCU) or including a system on a chip (SoC)) for cooperation in accordance with the demand for implementation.

Figure 2:
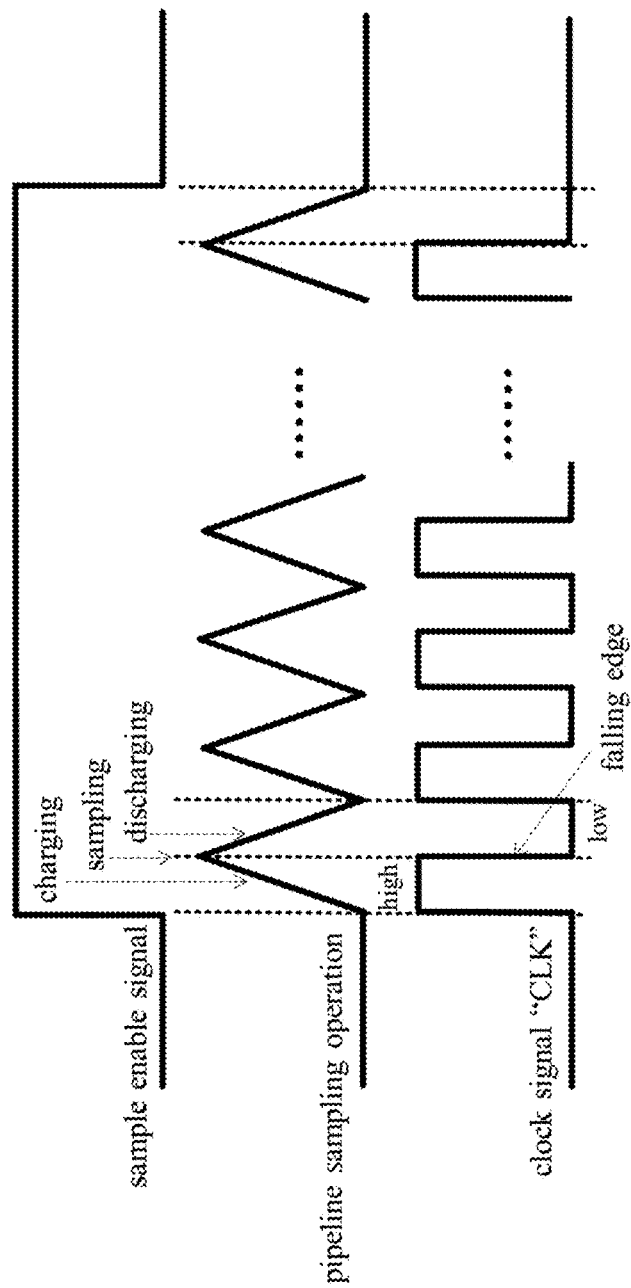
FIG. 2 shows a pipeline sampling operation carried out by the sampling circuit of FIG. 1.

Please refer to FIG. 1. In an exemplary implementation, the sampling circuit 110 executes sampling operation in a pipeline manner. As shown in FIG. 2, as to each clock cycle of the clock signal CLK in a duration of the sampling circuit 110 being enabled by a sample enable signal, the sampling circuit 110 charges at least one of the N capacitor(s) 12 during a first level (e.g., a high voltage level) of the clock signal CLK, samples the voltage(s) of the charged capacitor(s) to generate at least one sample value (e.g., a digital value) during a level transition (e.g., a falling edge of the clock signal) of the clock signal CLK, and discharges the charged capacitor(s) during a second level (e.g., a low voltage level) of the clock signal CLK. By means of the above-mentioned pipeline manner (a.k.a. the pipeline sampling operation), the at least one sample value carries the influence of environmental and noise factors on the charged capacitor(s). The sampling circuit 110 can perform the pipeline sampling operation to the N capacitor(s) 12 in order and then output N digital value(s) to the random number generating circuit 120 so that the random number generating circuit 120 can generate a random number according to at least a part of the N digital value(s). It should be noted that the waveforms of the charging and discharging signals used for charging/discharging the N capacitor(s) in the pipeline sampling operation are not limited to specific waveforms.

Figure 3A:
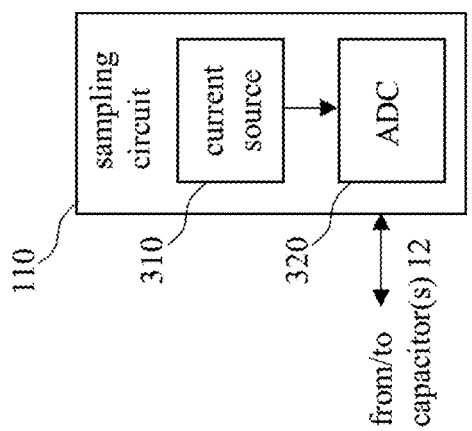
FIG. 3a shows an embodiment of the sampling circuit of FIG. 1.

FIG. 3a shows an embodiment of the sampling circuit 110 including a current source 310 (e.g., an adjustable current source) and an analog-to-digital converter (ADC) (e.g., a single-channel or multi-channel ADC) 320. The current source 310 is configured to provide at least one sampling current for charging/discharging the N capacitor(s) 12 directly/indirectly (e.g., through the ADC 320). The ADC 320 is configured to convert the voltage(s) of the N capacitor(s) 12 into N sample value(s). In addition, the sampling circuit 110 can optionally include or is coupled to a voltage-regulating circuit (not shown) so as to provide a regular voltage for the ADC 320. It should be noted that the N sample value(s) is/are true random number(s) due to the influence of noise and environmental factors. For instance, providing the ADC 320 is a 12-bit ADC, in a circumstance that the environmental factors change slowly and none of strong noise and malicious attack occur, the variation range of the difference between each of the N sample value(s) and a baseline capacitance value (i.e., a capacitance value obtained under a predetermined condition such as the first sample value of a capacitor obtained under the predetermined condition) could randomly fall within a capacitance value range between ±10~±30 providing the charging current is 5 µA and the baseline capacitance is 10 pF.

Figure 3B:
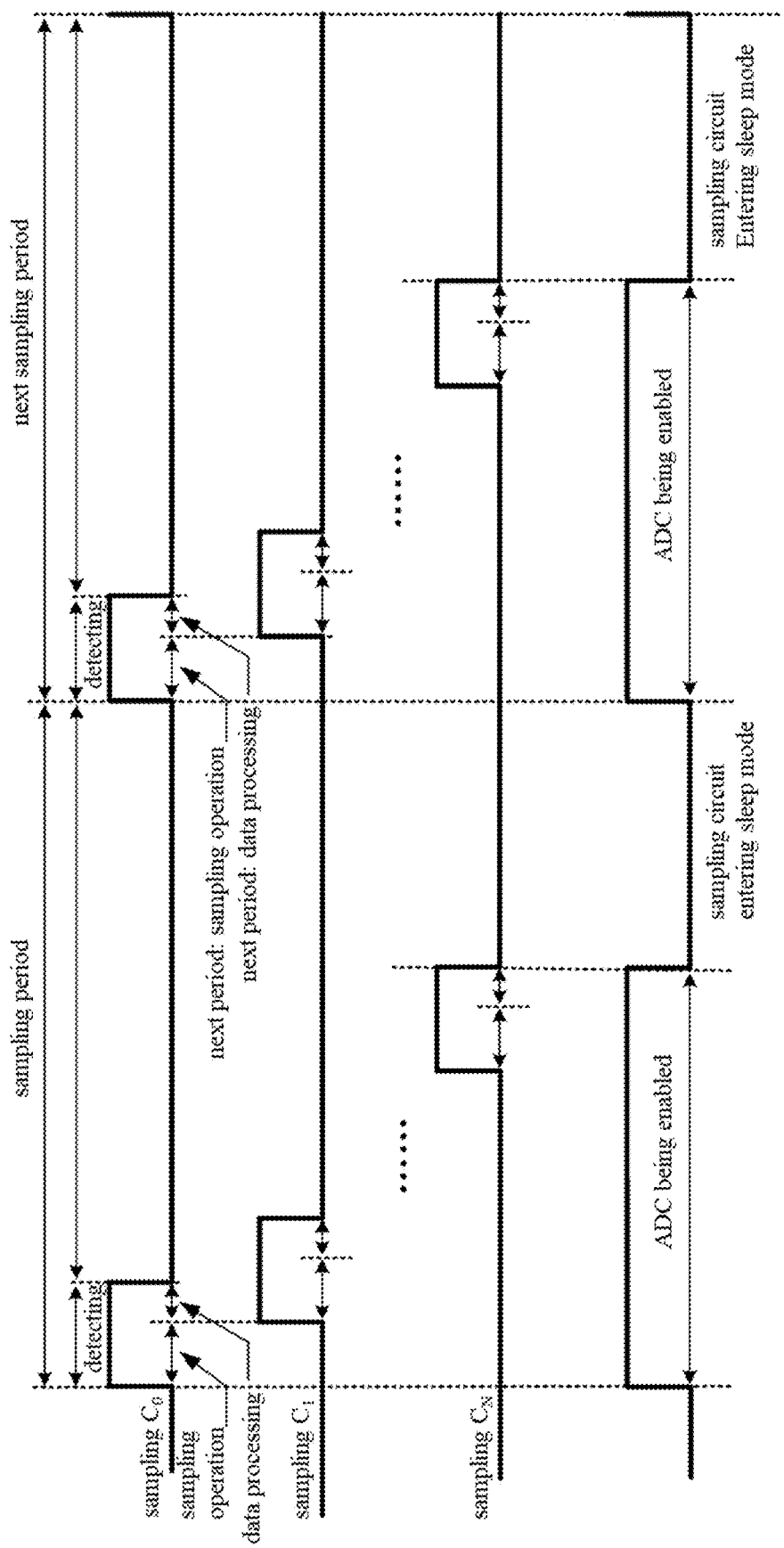
FIG. 3b shows an example of how the sampling circuit of FIG. 1 samples N capacitor(s) in order.

Please note that the sampling circuit 110 can sample the voltage(s) of the N capacitor(s) 12 in order. For instance, as shown in FIG. 3b, the sampling circuit 110 samples the voltage(s) of the capacitor(s) $C_1 \sim C_N$ in turn during the ADC 320 being enabled; the sampling period of the sampling circuit 110 is not shorter than the enable period of the ADC 320, and if the sampling period is longer than the enable period, the ADC 320/the sampling circuit 110 can optionally enter a sleep mode for saving power after the generation of the N sample value(s) till the start of the next sampling period. If some circuit is dedicated to sampling a specific capacitor, this circuit can enter the sleep mode when the specific capacitor is not under the sampling operation. Furthermore, the sampling circuit 110 can optionally sample a part of the N capacitors 12 instead of all according to the demand for implementation. In addition, the sample values of different capacitors are different due to different environmental and noise factors even though these capacitors are treated with the same parameter setting. The sample values outputted by the ADC 320 do not stand for capacitance directly; the present invention pays more attention to the sample value of a capacitor and the variation thereof rather than the actual capacitance of the capacitor.

Figure 4:
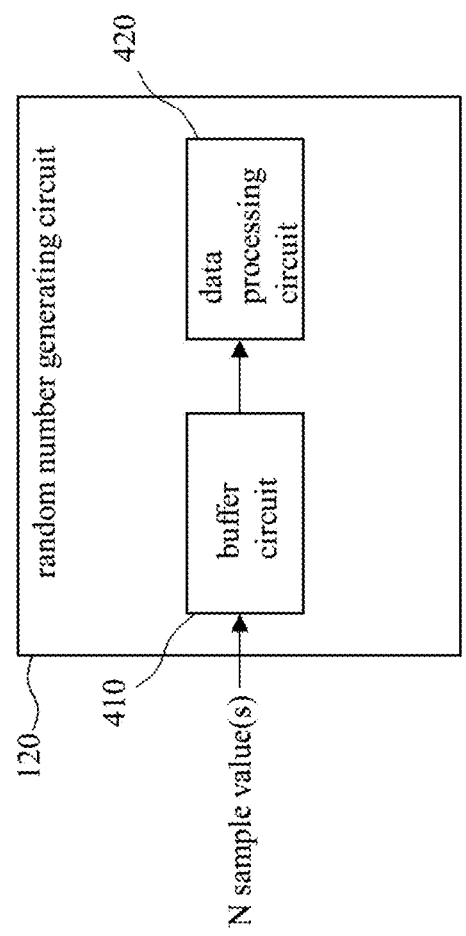
FIG. 4 shows an embodiment of the random number generator of FIG. 1.

FIG. 4 shows an embodiment of the random number generating circuit 120 of FIG. 1 including a buffer circuit 410 (e.g., a first-in-first-out buffer (FIFO)) and a data processing circuit 420. The buffer circuit 410 is configured to temporarily keep at least a part of the N sample value(s). The data processing circuit 420 is configured to process at least a part of the sample value(s) kept by the buffer circuit 410 according to a predetermined algorithm and thereby generate the random number. For instance, the sampling circuit 110 samples the voltage(s) of the N capacitor(s) 12 and stores the N sample value(s) in the buffer circuit 410 (i.e., FIFO 410 here); if all the storage space of the FIFO 410 is occupied, the oldest sample value in the FIFO 410 will be replaced by the latest sample value; therefore, based on the read/write principle of the FIFO 410, X piece(s) of data in the FIFO 410 may be some or all of X sample value(s) of discontinuous X capacitor(s) of the N capacitor(s) 12; afterwards, the data processing circuit 420 receives the X piece(s) of data from the FIFO 410 and obtains Y bit(s) (e.g., continuous/discontinuous Y bit(s)) of each piece of data, and then derives a new digital number from the obtained data according to the predetermined algorithm, wherein the new digital number is used as the random number. In an exemplary implementation, the predetermined algorithm can have the data processing circuit 420 put all obtained bits of the X pieces of data (i.e., Y×X bits) together in a predetermined order (e.g., a forward, backward, or interleaving order) and thereby synthesize these bits into the new digital number; however, this is just exemplary for understanding, not for limiting the scope of the present invention. In an exemplary implementation, the variable X is an integer between 4 and 32 (e.g., 3<X<33) and the variable Y is between 1 and 8 (e.g., 0<Y<9); in practice, the variables X and Y can be determined by those of ordinary skill in the art according to their demand for implementation.

Figure 5:
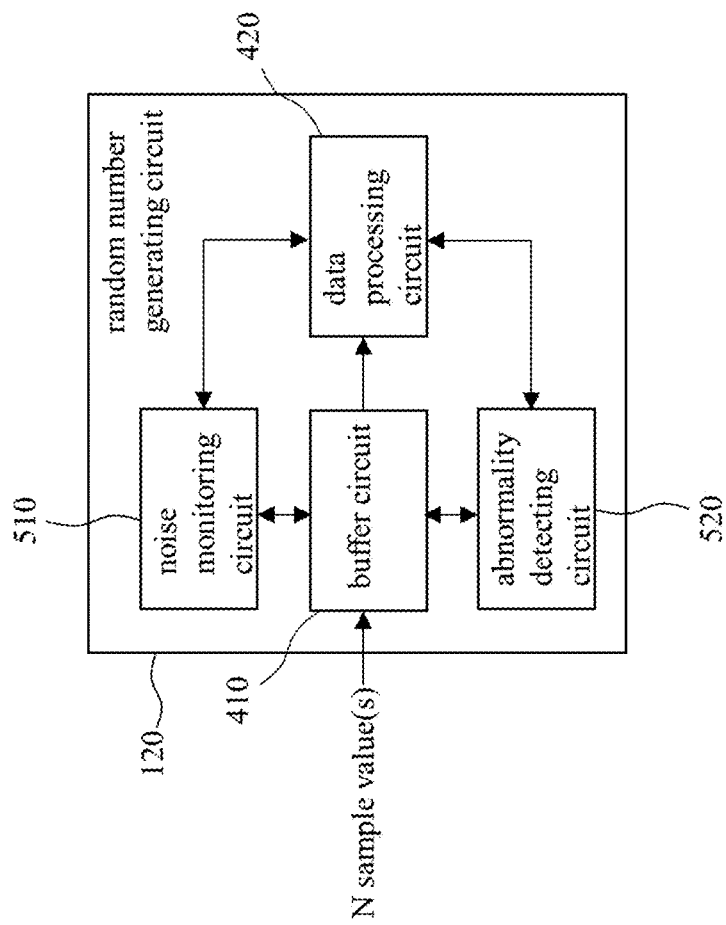
FIG. 5 shows another embodiment of the random number generator of FIG. 1.

FIG. 5 shows another embodiment of the random number generating circuit 120 of FIG. 1. Compared with FIG. 4, FIG. 5 further includes a noise monitoring circuit 510 and an abnormity detecting circuit 520, both of which can receive data from the buffer circuit 410 and optionally cooperate with the data processing circuit 420. The noise monitoring circuit 510 is configured to monitor the influence of factors (e.g., environmental temperature and humidity, electromagnetic interference, power noise, and so on) on the baseline capacitance of the N capacitor(s) 12 and thereby decide whether the N sample value(s) kept by the buffer circuit 410 is/are valid in accordance with at least one noise threshold and the N baseline capacitance value(s) of the N capacitor(s)

Figure 7:
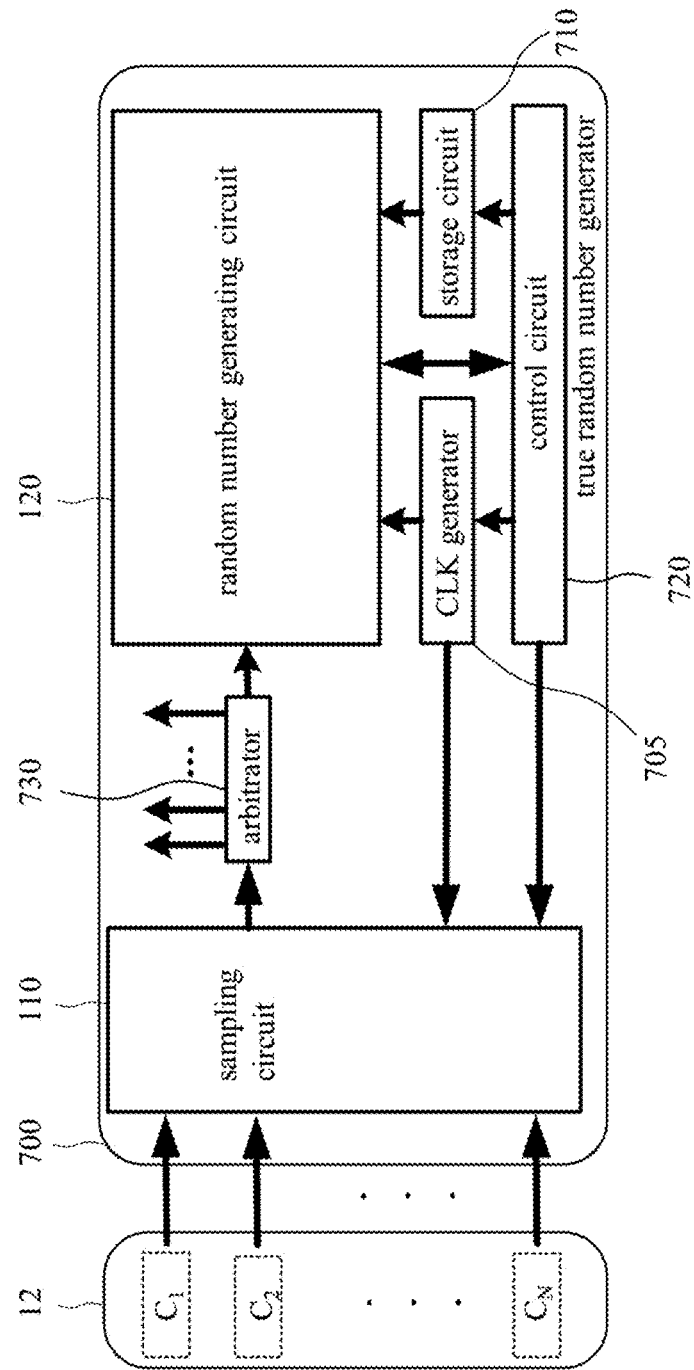
FIG. 7 shows another embodiment of the true random number generator of the present disclosure.

12, wherein the N baseline capacitance value(s) can be stored in a storage circuit (e.g., the aforementioned buffer circuit 410 or the storage circuit 710 of FIG. 7). For instance, the at least one noise threshold includes a positive noise threshold and a negative noise threshold; in a circumstance that the sample value of a capacitor is greater/smaller than the baseline capacitance value of the capacitor, which implies that the polarity of the difference between the two values is I/O, if the difference is smaller than the positive/negative noise threshold, the noise monitoring circuit 510 will decide that the sample value of the capacitor is valid, and if the difference is greater than the positive/negative noise threshold, the sample value will be determined invalid and be discarded. The abnormity detecting circuit 520 is configured to decide whether the N sample value(s) is/are in a regular circumstance. For instance, the abnormity detecting circuit 520 determines whether abnormal strong interference or malicious attack occurs according to the sample value of a capacitor or according to this sample value and the sampling-capability limits of the ADC 320; if the abnormity detecting circuit 520 finds that the sample value of the capacitor stays around the sampling-capability limit, the sample value continues to be equal to the sampling-capability limit (i.e., the maximum/minimum limit), or the sample value keeps unchanged, the abnormity detecting circuit 520 will adjust the sampling current of the current source 310 directly or indirectly (e.g., through the control circuit 720 of FIG. 7) to try to make the sample value be around the baseline capacitance value of the capacitor and vary randomly; after the sampling current is adjusted for predetermined times, if the sample value of the capacitor is still abnormal, the abnormity detecting circuit 520 will suspend the capacitor directly or indirectly (e.g., through the control circuit 720 of FIG. 7); and if all capacitors are suspended or the number of suspended capacitor(s) exceeds a predetermined number, the random number generating circuit 120 will stop generating the random number and send out a warning (e.g., a warning to the aforementioned host).

Figure 6:
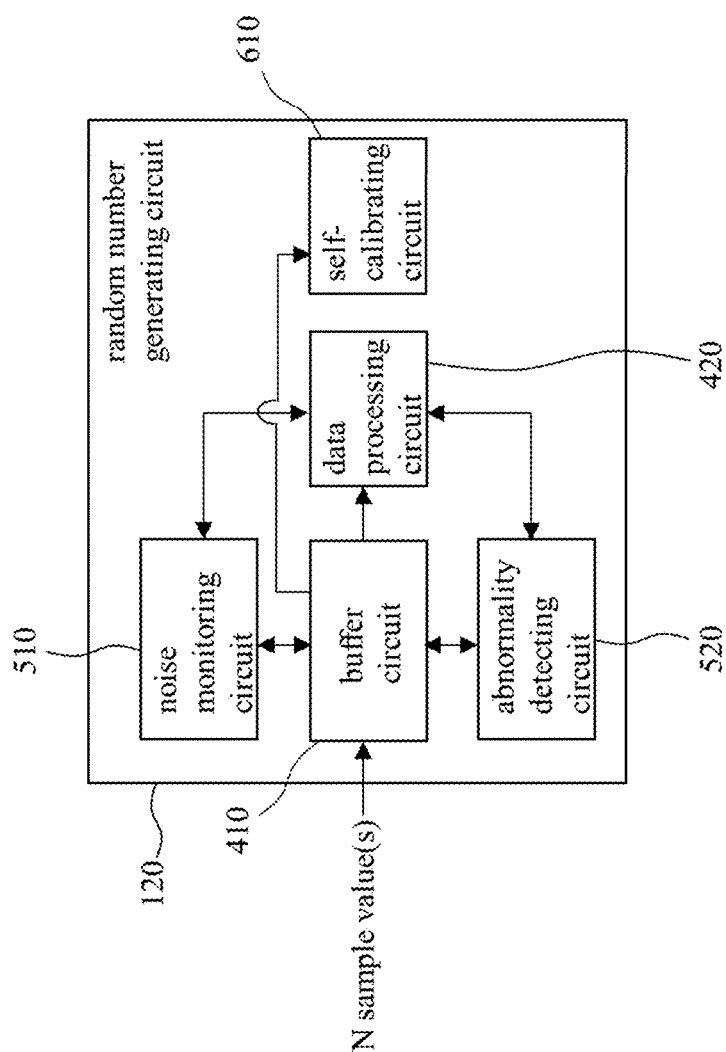
FIG. 6 shows yet another embodiment of the random number generator of FIG. 1.

FIG. 6 shows another embodiment of the random number generating circuit 120 of FIG. 6. Compared with FIG. 5, the embodiment of FIG. 6 further includes a self-calibrating circuit 610. The self-calibrating circuit 610 is configured to determine whether to update the baseline capacitance value (e.g., the baseline capacitance value stored in the storage circuit 710 of FIG. 7) of a present capacitor according to a present sample value of the present capacitor and the present baseline capacitance value. For instance, the self-calibrating circuit 610 includes a fixed/adjustable self-calibration interval and a self-calibration parameter; the self-calibrating circuit 610 receives a present sample value from the buffer circuit 510, and if the present sample value is valid, the self-calibrating circuit 610 processes a present difference between the present sample value and a present baseline capacitance value with a predetermined process (e.g., a data weighting process) based on a self-calibrating algorithm and on present self-calibrating parameter setting and thereby obtains a processed difference. In a circumstance that the processed difference is greater than the self-calibrating parameter, the self-calibrating circuit 610 updates the present baseline capacitance value with the self-calibration interval (e.g., the present baseline capacitance value plus/minus one unit of the self-calibration interval); and in a circumstance that the processed difference is smaller than the self-calibrating parameter, the self-calibrating circuit 610 records the present difference without updating the baseline capacitance value and then executes the predetermined process with the recorded difference and the latest obtained difference. Since the variation of actual environmental factors is usually slow, the aforementioned manner allows the self-calibrating circuit 610 to effectively adjust the baseline capacitance value of a capacitor in accordance with the slowly changed environmental factors and prevents the accumulated noise caused by the slow change from being mistaken for malicious attack; in addition, this manner will not dramatically calibrate the baseline capacitance value for pulsed, continuous, and serious noise interference and thus the real abnormal interference can be detected as malicious attack. It should be noted that the self-calibrating circuit 610 can periodically/non-periodically execute the calibration; for instance, the self-calibrating circuit 610 executes the calibration according to the sampling period of the sampling circuit 110.

FIG. 7 shows another embodiment of the true random number generator of the present disclosure. Compared with FIG. 1, the true random number generator 700 of FIG. 7 further includes a clock signal generator 705, a storage circuit 710, a control circuit 720, and an arbitrator 730. The storage circuit 710 is configured to provide the initial/present value of at least one parameter for the circuit(s) (e.g., the sampling circuit 110 and the random number generating circuit 120) of the true random number generator 700 in need of the at least one parameter. For instance, the at least one parameter includes a sampling parameter, random number synthesis parameter, noise monitoring parameter, abnormity detecting parameter, etc., in which the sampling parameter includes the setting of sampling current, the number of sampling times, and the period of the sleep mode, the random number synthesis parameter includes the aforementioned variables X and Y and the aforementioned data synthesis manner, the noise monitoring parameter includes the aforementioned at least one noise threshold and the baseline capacitance value of each of the N capacitor(s), and the abnormity detecting parameter includes the aforementioned sampling-capability limit or the predetermined analyzing condition. The control circuit 720 is configured to control the operation of the circuits in the true random number generator 700 (e.g., the sampling circuit 110, random number generating circuit 120, clock signal generator 705, storage circuit 710, and arbitrator 730); for instance, the control circuit 720 controls the frequency and/or the output of the clock signal CLK, controls the sampling circuit 110 to sample an appointed capacitor, controls the operation timing of each circuit, enables/disables each circuit, and controls each circuit to retrieve, update, and/or store parameters. The arbitrator 730 is electrically coupled between the sampling circuit 110 and the random number generating circuit 120 and configured to output the N sample value(s) to at least one of the random number generating circuit 120 and an external circuit (not shown); accordingly, during a period without the need of a random number, the sampling circuit 110 can be used for other purposes. In an alternative embodiment, the true random number generator of the present disclosure operates in conjunction with at least one of an external clock signal generating circuit, an external storage circuit, and an external control circuit.

Figure 8:
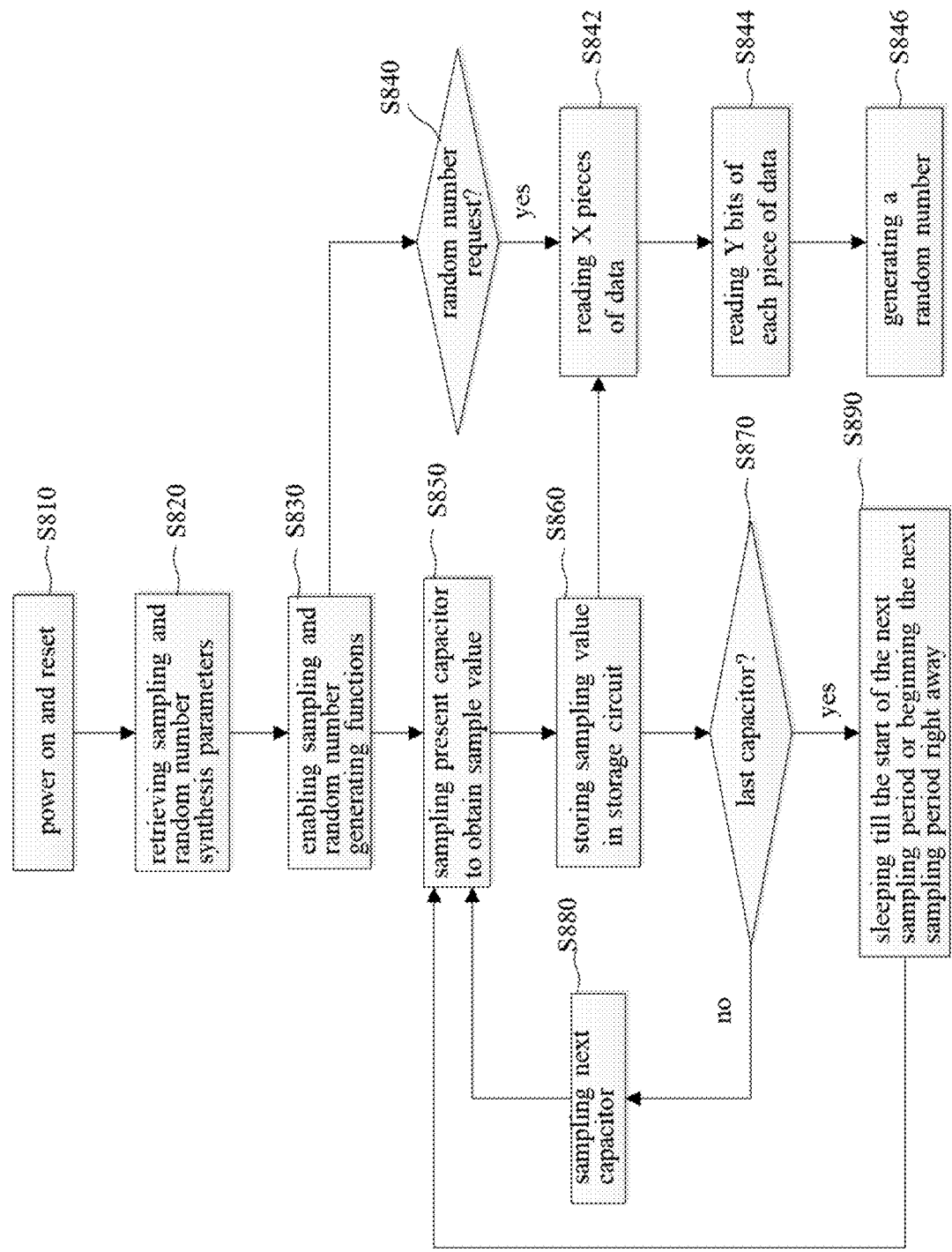
FIG. 8 shows an embodiment of the method of the present disclosure for generating a true random number.

FIG. 8 shows an embodiment of the method of the present disclosure for generating a true random number. This embodiment includes the following steps:

step S810: power on and reset.

step S820: retrieving sampling parameters and random number synthesis parameters.

step S830: enabling a sampling function and a random number generating function.

step S840: determining whether a random number request is received.
step S842: reading X pieces of data.
step S844: reading Y bits of each piece of data.
step S846: generating a random number.
step S850: sampling a present capacitor to obtain a sample value.
step S860: storing the sampling value in a storage circuit.
step S870: determining whether the present capacitor is the last capacitor to be sampled.
step S880: sampling the next capacitor.
step S890: sleeping till the start of the next sampling period or beginning the next sampling period right away.

It should be noted that after the random number generating function is enabled, steps S840-S846 can be executed cyclically without considering steps S850-S890; and after the sampling function is enabled, steps S850-S890 can be executed cyclically without considering steps S840-S846.

Figure 9:
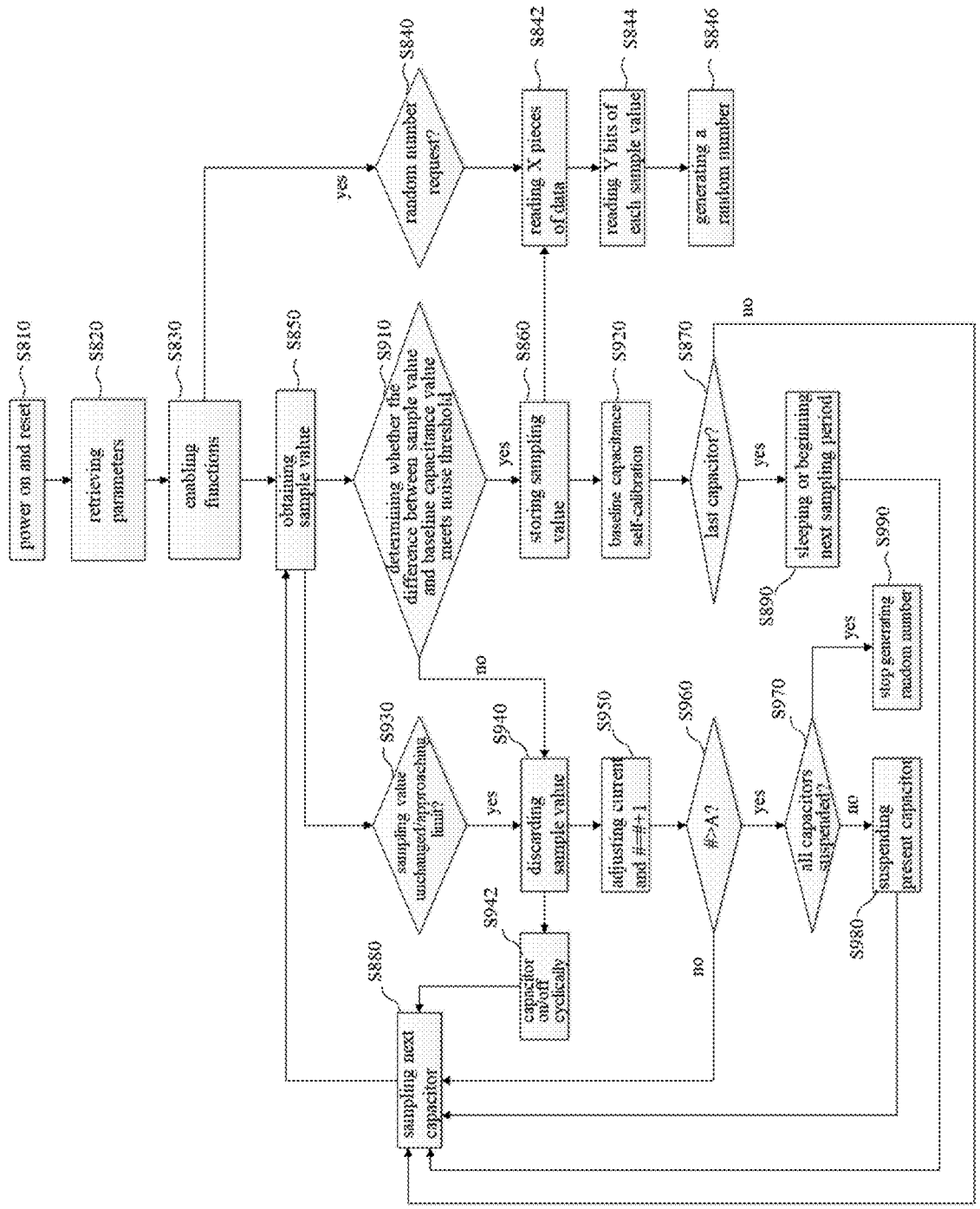
FIG. 9 shows another embodiment of the method of the present disclosure for generating a true random number.

FIG. 9 shows another embodiment of the method of the present disclosure for generating a true random number. Compared with FIG. 8, the embodiment of FIG. 9 incorporates an intelligent protecting manner and further includes:
step S910: determining whether the difference between a sample value and a baseline capacitance value is positive (i.e., the polarity is 1) and smaller than a positive noise threshold, or whether the difference is negative (i.e., the polarity is 0) and smaller than a negative noise threshold.
step S920: performing self-calibration to baseline capacitance.
step S930: determining whether the sampling value keep(s) unchanged or approach(es)/equal(s) a sampling-capability limit.
step S940: discarding the sampling value.
step S942: cyclically turning on and off non-suspended capacitor(s) for the sampling operation.
step S950: adjusting the sampling current and adding one to a number of adjustments (i.e., the notation "#=#+1" of FIG. 9).
step S960: determining whether the number of adjustments is greater than a predetermined number (e.g., a positive integer "A").
step S970: determining whether all capacitor(s) is/are suspended.
step S980: suspending the present capacitor.
step S990: stopping generating a random number.

It should be noted that after the random number generating function is enabled, steps S840~S846 can be executed cyclically without considering steps S850~S890; and after the sampling function is enabled, steps S850~S890 can be executed cyclically without considering steps S840~S846.

Since those of ordinary skill in the art can appreciate the detail and modification of the embodiments of FIGS. 8-9 by referring to the disclosure of the embodiments of FIGS. 1-7, repeated and redundant description is omitted here.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the true random number generator and the method for generating a true random number of the present disclosure are easy to be realized with less/no additional hardware expense and are reliable and efficient.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A true random number generator, comprising:
a sampling circuit configured to sample N voltage(s) of N capacitor(s) according to a clock signal and thereby generate N sample value(s), in which the N is a positive integer;
a random number generating circuit configured to generate a random number according to at least a part of the N sample value(s); and
an arbitrator electrically coupled between the sampling circuit and the random number generating circuit and configured to output the N sample value(s) to at least one of the random number generating circuit and an external circuit.

2. The true random number generator of claim 1, wherein the N capacitor(s) is/are N parasitic capacitor(s).

3. The true random number generator of claim 1, wherein the sampling circuit executes following steps according to the clock signal:
charging a present capacitor of the N capacitor(s) during a first level of the clock signal;
sampling a voltage of the present capacitor during a level transition of the clock signal and thereby generating a present sample value, wherein the clock signal changes from the first level to a second level during the level transition of the clock signal; and
discharging the present capacitor during the second level of the clock signal.

4. The true random number generator of claim 1, wherein the sampling circuit includes:
a current source configured to provide at least one sampling current for charging the N capacitor(s); and
an analog-to-digital converter configured to convert the N voltage(s) of the N capacitor(s) into the N sample value(s).

5. The true random number generator of claim 1, wherein the random number generating circuit includes:
a buffer circuit configured to temporarily keep the at least a part of the N sample value(s); and
a data processing circuit configured to process some or all of the at least a part of the N sample value(s) with a predetermined algorithm and thereby generate the random number.

6. The true random number generator of claim 5, wherein the random number generating circuit further includes at least one of following circuits:
a noise monitoring circuit configured to determine whether the N sample value(s) is/are valid according to a noise threshold and baseline capacitance of the N capacitor(s); and
an abnormity detecting circuit configured to determine whether the N sample value(s) is/are in a regular circumstance according to a predetermined analyzing condition.

7. The true random number generator of claim 6, further comprising:
a control circuit configured to determine whether to suspend at least a part of the N capacitor(s) and/or to adjust operation of the sampling circuit according to determinations of the noise monitoring circuit and the abnormity detecting circuit.

8. The true random number generator of claim 7, wherein after the control circuit suspends a predetermined number of capacitor(s) of the N capacitor(s), the control circuit prevents the random number generating circuit from generating the random number.

9. The true random number generator of claim 5, wherein the random number generating circuit further includes:
a self-calibrating circuit configured to determine whether to update a baseline capacitance value of a present capacitor of the N capacitor(s) according to a present sample value of the N sample value(s) and the baseline capacitance value of the present capacitor.

10. The true random number generator of claim 5, wherein the buffer circuit includes a first-in-first-out buffer.

11. A true random number generator, comprising:
a sampling circuit configured to sample N voltage(s) of N capacitor(s) according to a clock signal and thereby generate N sample value(s), in which the N is a positive integer;
a random number generating circuit configured to generate a random number according to at least a part of the N sample value(s);
a storage circuit configured to provide at least one parameter initial value for the random number generating circuit; and
a control circuit configured to control operation of the sampling circuit, the random number generating circuit, and the storage circuit.

12. A method for generating a true random number, comprising:
sampling N voltage(s) of N capacitor(s) according to a clock signal and thereby generate N sample value(s), in which the N is a positive integer;
generating the true random number according to at least a part of the N sample value(s); and
determining whether to update a baseline capacitance value of a present capacitor of the N capacitor(s) according to a present sample value of the N sample value(s) and the baseline capacitance value of the present capacitor.

13. The method for generating the true random number of claim 12, wherein the N capacitor(s) is/are N parasitic capacitor(s).

14. The method for generating the true random number of claim 12, wherein the N capacitor(s) include(s) the present capacitor, the N sample value(s) include(s) the present sample value, and the step of generating the true random number includes:
charging the present capacitor during a first level of the clock signal;
sampling a voltage of the present capacitor during a level transition of the clock signal and thereby generating the present sample value, wherein the clock signal changes from the first level to a second level during the level transition of the clock signal; and
discharging the present capacitor during the second level of the clock signal.

15. The method for generating the true random number of claim 12, further comprising:
outputting the N sample value(s) to at least one of a random number generating circuit and an external circuit in accordance with a random number request, wherein the random number generating circuit is for executing the step of generating the true random number.

16. The method for generating the true random number of claim 12, wherein the step of generating the N sample value(s) includes:
providing at least one sampling current to charge the N capacitor(s); and
converting the N voltage(s) of the N capacitor(s) into the N sample value(s).

17. The method for generating the true random number of claim 12, wherein the step of generating the true random number includes:
temporarily keeping the at least a part of the N sample value(s); and
processing some or all of the at least a part of the N sample value(s) with a predetermined algorithm and thereby generating the true random number.

18. The method for generating the true random number of claim 12, further comprising at least one of following steps:
determining whether the N sample value(s) is/are valid according to a noise threshold and baseline capacitance of the N capacitor(s); and
determining whether the N sample value(s) is/are in a regular circumstance according to a predetermined analyzing condition.

* * * * *